United States Patent
Behrens et al.

[11] Patent Number: 6,135,558
[45] Date of Patent: Oct. 24, 2000

[54] MOTOR VEHICLE SEAT WITH BACKREST FOLDABLE INTO SLEEPING POSITION

[75] Inventors: Meinhard Behrens, Obernkirchen; Jan Klindworth, Munich, both of Germany

[73] Assignee: Bertrand Faure Sitztechnik GmbH & Co. KG, Stadthagen, Germany

[21] Appl. No.: 09/285,970

[22] Filed: Apr. 5, 1999

[30] Foreign Application Priority Data

Apr. 4, 1998 [DE] Germany ............... 198 15 163

[51] Int. Cl.⁷ .................................................. B60N 2/02
[52] U.S. Cl. ..................... 297/353; 296/65.09; 296/69; 297/378.12; 297/321
[58] Field of Search ............... 297/354.13, 378.12, 297/342, 321, 353; 296/65.05, 65.09, 69

[56] References Cited

U.S. PATENT DOCUMENTS

| | | | |
|---|---|---|---|
| 3,059,969 | 10/1962 | Schliepacke | 297/321 |
| 3,910,626 | 10/1975 | Hobbsiefken | 296/69 |
| 4,343,508 | 8/1982 | Heling et al. | 296/69 X |
| 4,512,609 | 4/1985 | Parsson | 296/65.09 X |
| 4,518,201 | 5/1985 | Wahlmann et al. | 296/65.09 X |
| 5,482,349 | 1/1996 | Richter et al. | 297/321 X |
| 5,795,023 | 8/1998 | Kayumi | 296/69 X |

FOREIGN PATENT DOCUMENTS

| | | |
|---|---|---|
| 3222273A1 | 2/1983 | Germany . |
| 9204215 U | 1/1993 | Germany . |

*Primary Examiner*—Peter M. Cuomo
*Assistant Examiner*—Stephen Vu
*Attorney, Agent, or Firm*—Flangan & Flanagan; John R. Flanagan; John K. Flanagan

[57] ABSTRACT

A motor vehicle seat includes a backrest, a seat cushion and a coupling mechanism movably coupling the seat cushion to the backrest. The backrest is foldable between an erected seating position and a folded sleeping position. The seat cushion is movable between a retracted seating position and an extended sleeping position. The coupling mechanism couples mechanically the seat cushion to the backrest such that the folding of the backrest from the erected seating position to the folded sleeping position causes displacement of the seat cushion from the retracted seating position to the extended sleeping position. In the extended position, the seat cushion is substantially horizontally aligned with the backrest in the folded sleeping position.

13 Claims, 5 Drawing Sheets

MOTOR VEHICLE SEAT WITH BACKREST FOLDABLE INTO SLEEPING POSITION

BACKGROUND OF THE INVENTION

1. Field of the Invention

The present invention relates to motor vehicle seats and, more particularly, is concerned with a motor vehicle seat having a backrest foldable between an erected seating position and a folded sleeping position and a seat cushion normally disposed in a retracted seating position and being mechanically coupled to the backrest such that the folding of the backrest from the erected seating position to the folded sleeping position causes displacement of the seat cushion from the retracted seating position to an extended sleeping position in which the seat cushion is substantially aligned with the backrest in the folded sleeping position.

2. Description of the Prior Art

German Patent Document No. DE 32 22 273 A1 discloses a latching mechanism for a motor vehicle seat. The seating portion of this motor vehicle seat is supported on the motor vehicle floor on the front end of the seating portion via arms provided on both sides. Each of these arms has a vertically disposed slot in which is guided a pin mounted stationary on the seating portion. Each pin is normally held in an upper position of the respective slot by a catch pivotally mounted on the respective arm and disposed in a closing position. Each catch is prestressed to the closing position through action of a biasing force imposed by a tension spring and connected via a wire with a backrest of the motor vehicle seat. When the backrest is folded back, sufficient tension is exerted on each of the wires to overcome the biasing force of the tension springs and pivot the catches such that the pins are released and can glide downwardly in the slots of the arms. This changes the seating portion into a lowered position either by its own weight or by pressure from above on its front end. In the lowered position the seating portion is substantially aligned in contact on the backrest which is completely folded back.

One disadvantage of this solution is that the required latching mechanism is structured in a rather complicated manner. Another disadvantage is that the seating portion is not necessarily lowered in view of the absence of the application of any positive force, such as generated directly through the folding of the backrest, but rather is lowered only under the effect of gravity or by the application of additional external forces.

In German Patent Document No. DE 92 04 215 U1 a folding seat bench for mobile homes is described. This bench comprises a box-form seat frame supporting a seating portion and which, as is customary in mobile homes, can be used as storage space. A backrest frame is carried in the seat frame on the motor vehicle floor and therein locked at lower supports of the seat frame. The backrest frame is supported on the back wall of the seat frame. First guide bars are provided having lower ends secured by pivots at lower supports provided on both sides of the seat frame and also having upper ends connected via pivots with the backrest frame. In addition, two further guide bars are provided having upper ends fastened with a seat cushion and also having lower ends secured by pivots on the backrest frame. After releasing the latching of the backrest frame, it can be pivoted forward together with the guide bars and thereby the seat cushion is simultaneously displaced forwardly. At the completion of this motion by the backrest frame, in which it is simultaneously or subsequently folded rearwardly about its pivot with the first guide bars, its upholstery forms together with the seat cushion a substantially level resting surface. The kinematics of the motion system, comprised by the backrest frame and first and second guide bars, do not necessarily take place in view of the absence of the application of any positive force, so that this folding seat bench is not user-friendly.

SUMMARY OF THE INVENTION

The present invention overcomes the aforementioned problems by providing a motor vehicle seat which utilizes a simple and user-friendly mechanical coupling mechanism to attain the desired sleeping position. According to the present invention, the mechanical coupling mechanism employs at least two coupling elements which interconnect the backrest and seat cushion of the motor vehicle seat as well as front guide bars of the seat cushion. The coupling elements ensure that through the folding back of the backrest the seat cushion is moved into a position in which it forms with the folded-back backrest a substantially level and gapless sleeping surface.

Accordingly, the present invention is directed to a motor vehicle seat which basically includes a backrest, a seat cushion, and a coupling mechanism movably coupling the seat cushion to the backrest. The backrest is foldable between an erected seating position and a folded sleeping position. The seat cushion is movable between a retracted seating position and an extended sleeping position. The coupling mechanism couples mechanically the seat cushion to the backrest such that the folding of the backrest from the erected seating position to the folded sleeping position causes displacement of the seat cushion from the retracted seating position to the extended sleeping position. In the extended position, the seat cushion is substantially horizontally aligned with the backrest in the folded sleeping position.

More particularly, the backrest has a folding axis extending transversely through a lower end of the backrest. The backrest is mounted to undergo pivotal movement about the folding axis. The coupling mechanism includes a pair of front guide bars disposed adjacent to opposite sides and at a front end of the seat cushion and supporting the front end of the seat cushion such that the seat cushion can undergo displacement between the retracted seating position and extended sleeping position. The coupling mechanism also includes a pair of lever elements disposed adjacent to and fixedly attached at opposite sides of the seat cushion adjacent to a rear end thereof. The coupling mechanism further includes a pair of rigid coupling elements disposed adjacent to the opposite sides and at the rear end of the seat cushion and pivotally mounted to said backrest. The lever elements are respectively pivotally connected to the coupling elements. The coupling elements are also mounted to the folding axis at the lower end of the backrest such that movement of the backrest between the erected seating position and folded sleeping position causes movement of the coupling elements about the folding axis of the backrest and displacement of the seat cushion between the retracted seating position and extended sleeping position. In one embodiment, the coupling elements are pivotally mounted at the lower end of the backrest to undergo pivotal movement relative to the backrest about the folding axis. In another embodiment, the coupling elements are fixedly mounted at the lower end of the backrest to undergo pivotal movement with the backrest about the folding axis.

The backrest also includes a pair of stops stationarily mounted on and extending outwardly from the respective opposite sides of the backrest adjacent to the folding axis thereof. The coupling elements extend upwardly from the folding axis along the opposite sides of the backrest at the lower end thereof and are engagable with one of the stops stationarily mounted on the backrest such that during pivotal folding of the backrest toward the folded sleeping position the stops on the backrest carry along the coupling elements and correspondingly cause the coupling elements to pivot about the folding axis of the backrest relative to the seat cushion.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made t e attached drawings in which.

DETAILED DESCRIPTION OF THE INVENTION

Figure 1:
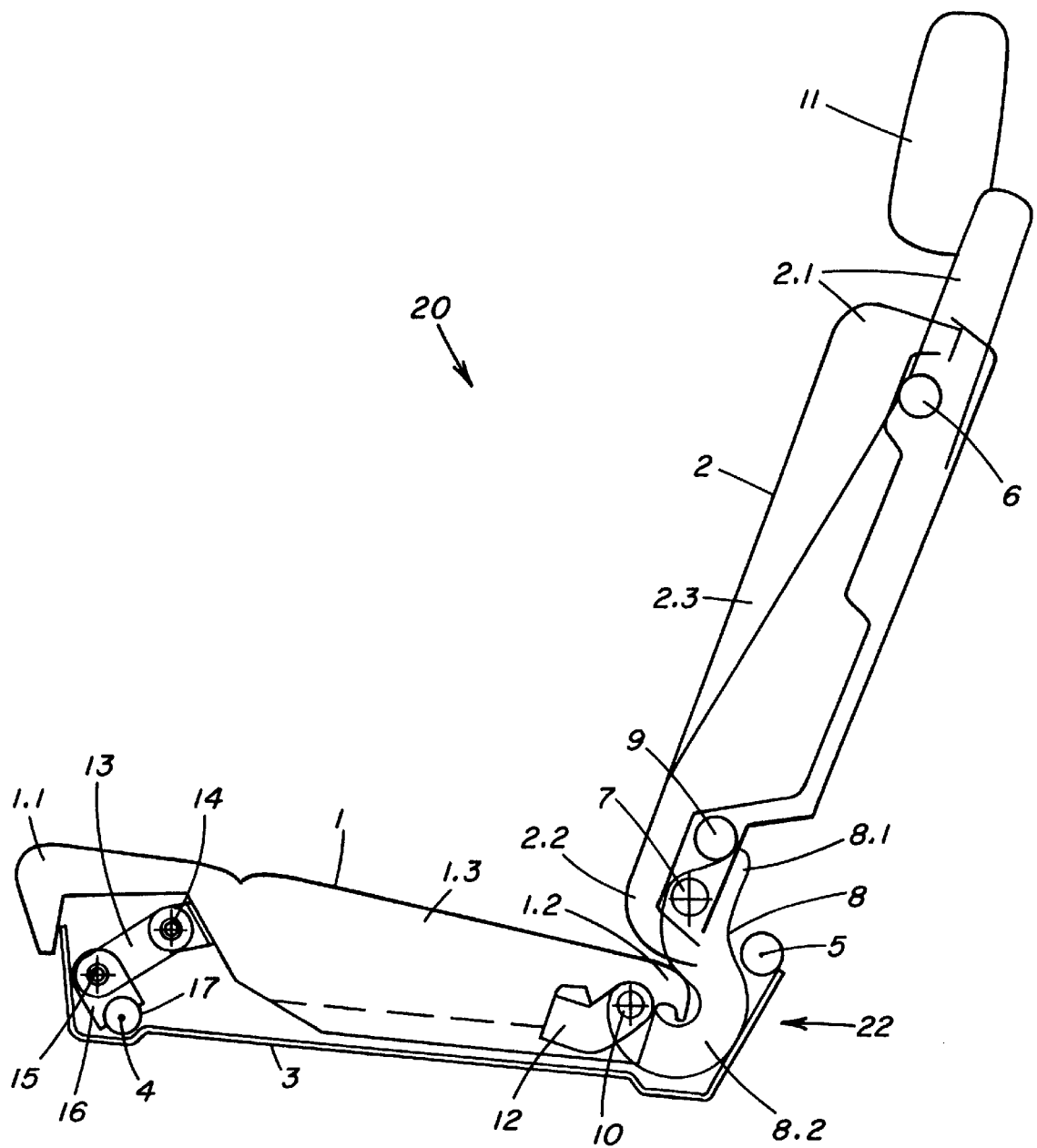
FIG. 1 is a side elevational view of a first embodiment of a motor vehicle seat of the present invention in a seating condition wherein a backrest of the seat is disposed in an erected seating position and a seat cushion of the seat is dispose in a retracted seating position.
Figure 2:
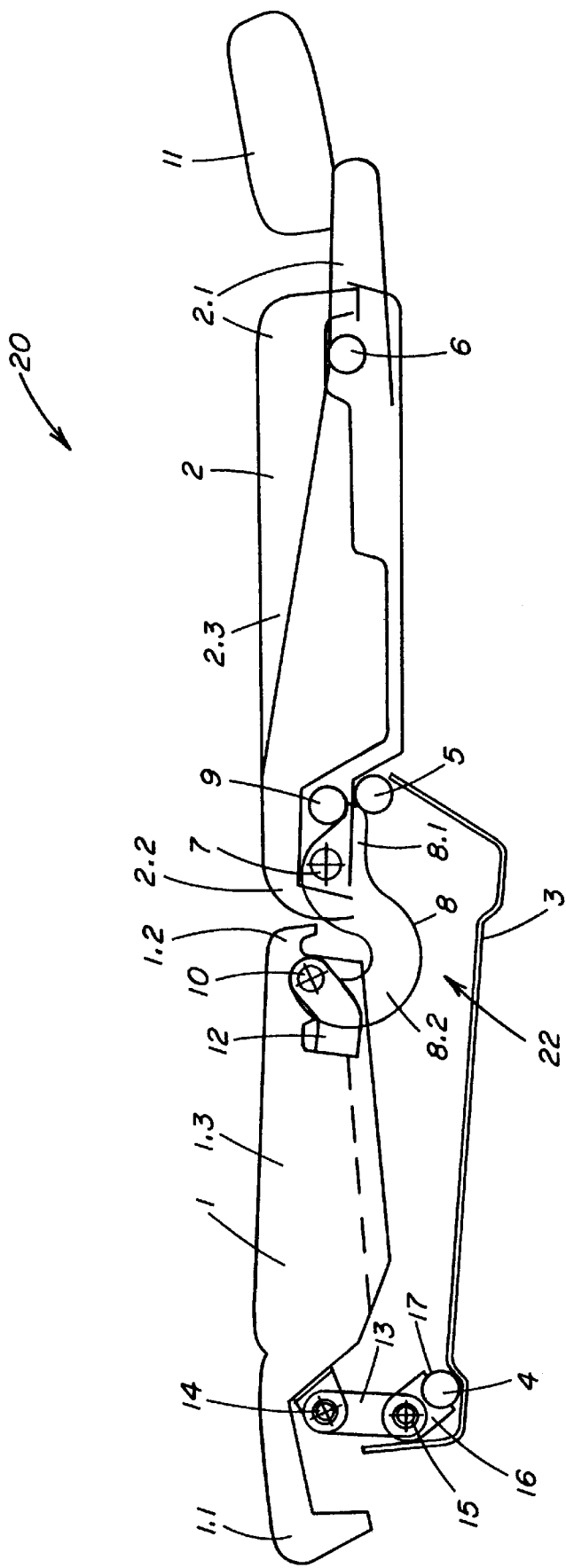
FIG. 2 is a side elevational view of the motor vehicle seat of FIG. 1 in a sleeping condition wherein the backrest of the seat is disposed in a rearwardly folded sleeping position and the seat cushion of the seat is disposed in an extended sleeping position.
Figure 4:
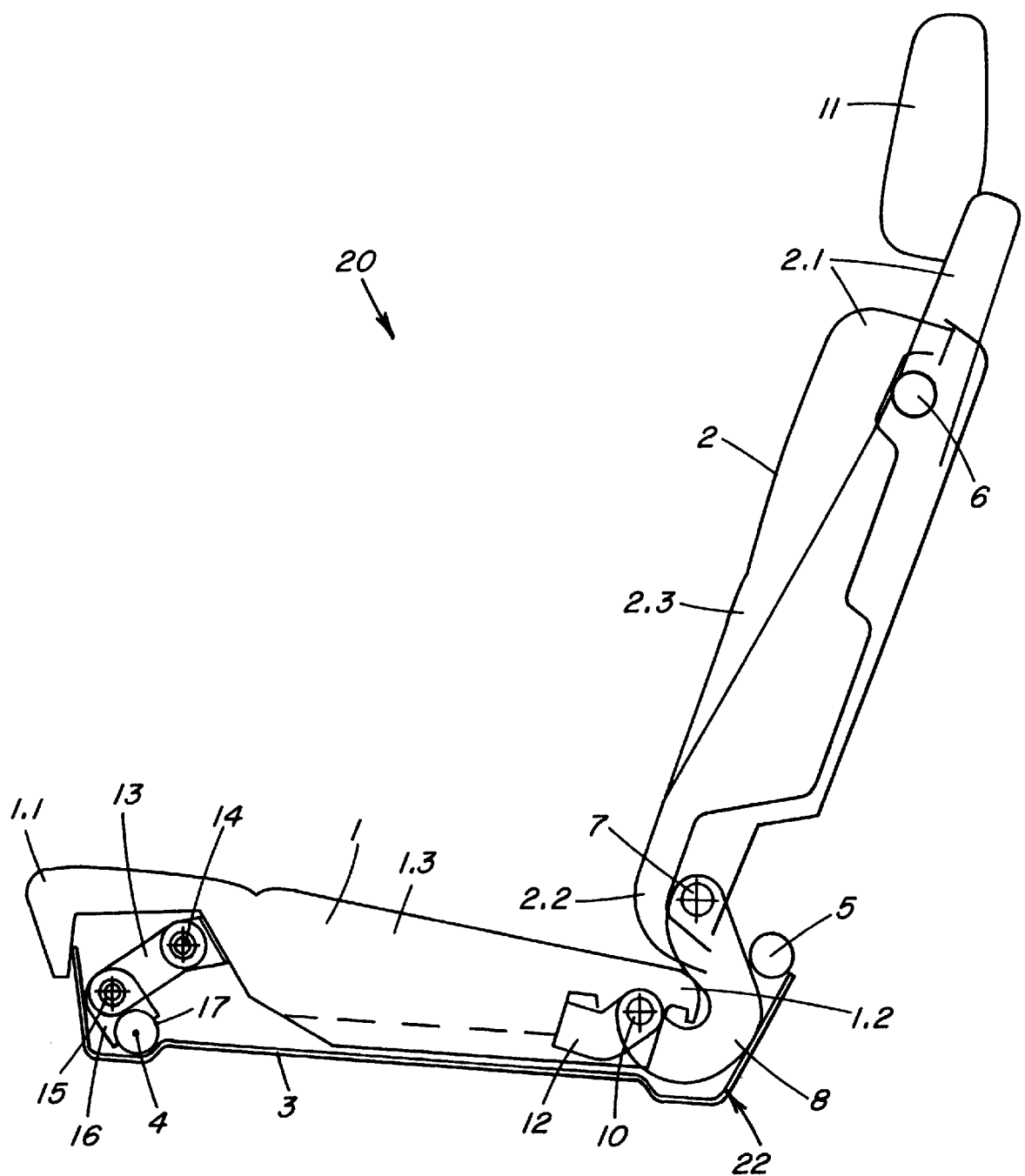
FIG. 4 is a side elevational view of a second embodiment of a motor vehicle seat of the present invention in the seating condition wherein the backrest of the seat is disposed in the erected seating position and a seat cushion of the seat is disposed in the retracted seating position.
Figure 5:
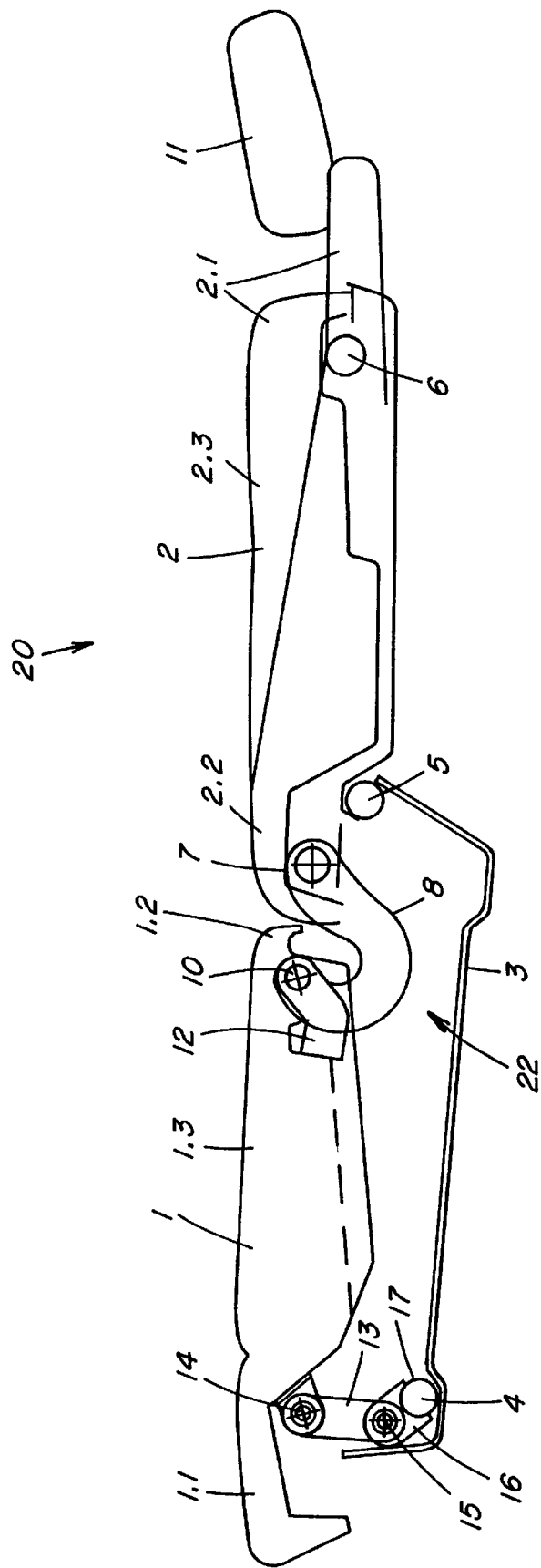
FIG. 5 is a side elevational view of the motor vehicle seat of FIG. 4 in the sleeping condition wherein the backrest of the seat is disposed in the rearwardly folded sleeping position and the seat cushion of the seat is disposed in the extended sleeping position.

Referring to the drawings and particularly to FIGS. 1, 2, 4 and 5, there is schematically illustrated a motor vehicle seat of the present invention, generally designated 20. While the motor vehicle seat 20 depicted in the drawings is particularly suitable for use in a van or minibus, the principles of the present invention are equally applicable to seats for a variety of conventional motor vehicles. The seat 20 basically includes a backrest 2 foldable about a folding axis 7 between an erected seating position as seen in FIGS. 1 and 4 and a folded sleeping position as seen in FIGS. 2 and 5, a seat cushion 1 movable between a retracted seating position as seen in FIGS. 1 and 4 and an extended sleeping position as seen in FIGS. 2 and 5, and a coupling mechanism 22 for mechanically coupling the seat cushion 1 to the backrest 2 such that pivoting or folding of the backrest 2 about the folding axis 7 from the erected seating position to the folded sleeping position causes displacement of the seat cushion 1 from the retracted seating position to the extended sleeping position. In the extended sleeping position, the seat cushion 1 is substantially horizontally aligned with the backrest 2 in the folded sleeping position. It should be pointed out here that within the scope of the present invention the term "seat" is understood to mean seat or bench and the term "seat cushion" is understood to refer to not only the upholstery but also to the substructure bearing it.

The seat 20 can extend from lateral wall to lateral wall (not shown) of the chassis of the motor vehicle and is mounted on the lateral walls. For this purpose, on each of the lateral walls three fastening points 4, 5 and 6 are provided which in FIGS. 1 to 5 are symbolically represented by circles. These fastening points 4, 5 and 6 are latching connections so that, after releasing these latches with the lateral walls of the motor vehicle chassis, the seat 20 can be displaced in the forward or the rearward direction. If only the two fastening points 6 are released, the backrest 2 can be folded about its folding axis 7 toward the rear. The seat cushion 1 is covered in the downward direction by a tub 3. The seat cushion 1 has opposite front and rear ends 1.1, 1.2 and opposite sides 1.3 extending between the front and rear ends 1.1, 1.2. The backrest 2 has opposite upper and lower ends 2.1, 2.2 and opposite sides 2.3 extending between the upper and lower ends 2.1, 2.2. The folding axis 7 is defined transversely through the backrest 2 between the opposite sides 2.3 thereof and at the lower end 2.2 thereof. The backrest 2 has a head support 11 mounted thereto and disposed above the upper end 2.1 of the backrest 2.

The preceding description applies equally to both first and second embodiment of the seat 20. In the following description, initially, a first embodiment of the seat 20 according to FIGS. 1 to 3 will be explained and, then, a second embodiment of the seat 20 according to FIGS. 4 and 5 will be explained.

Figure 3:
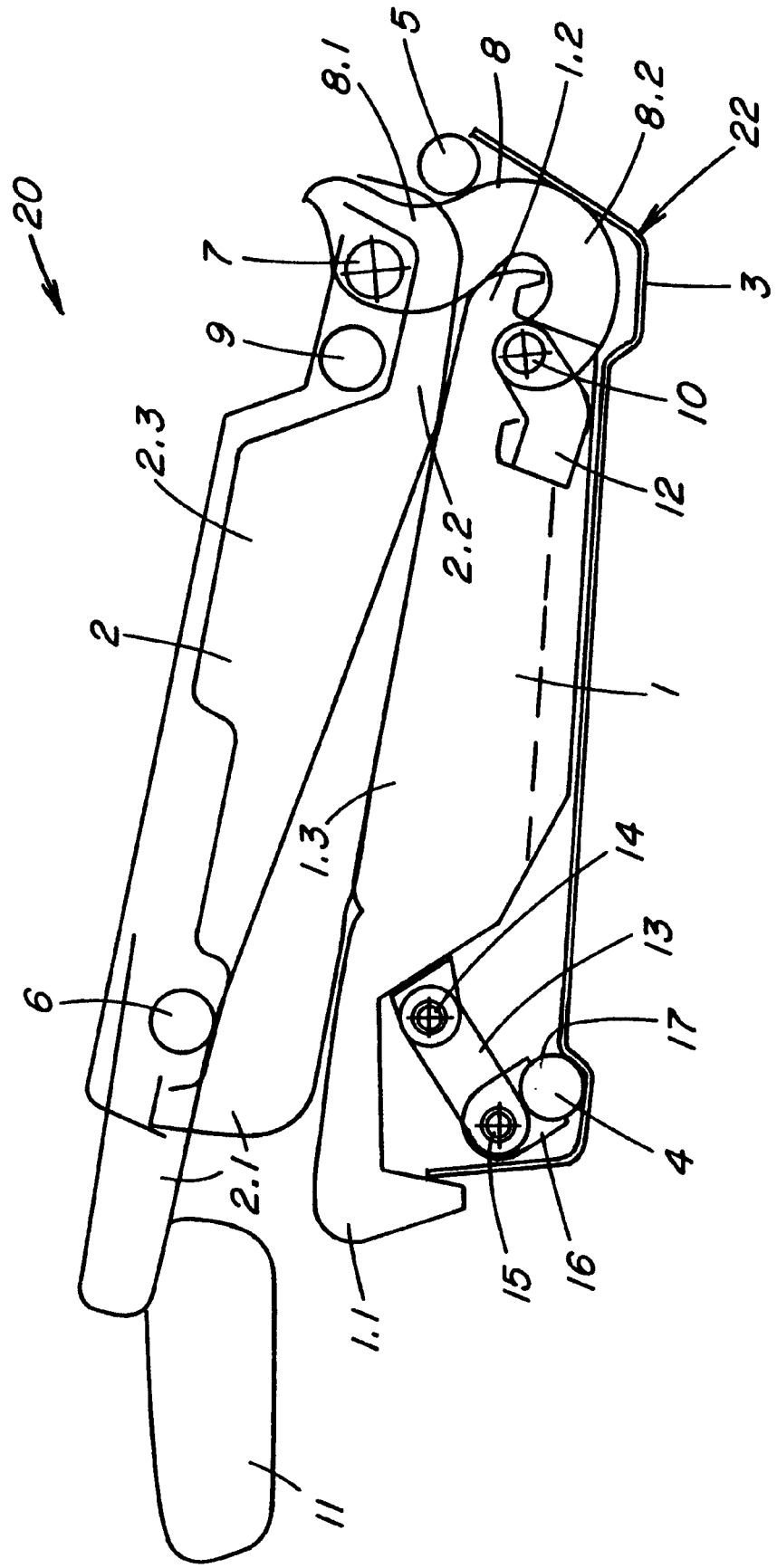
FIG. 3 is a side elevational view of the motor vehicle seat of FIG. 1 in a storage condition wherein the backrest of the seat is disposed in a forwardly or reverse folded position in which the backrest overlies the seat cushion of the seat being disposed in the retracted seating position.

Referring now to FIGS. 1 to 3, there is depicted the first embodiment of the vehicle motor seat 20 according to the present invention. The coupling mechanism 22 includes a pair of coupling elements 8 pivotally mounted on the folding axis 7 of the backrest 2 along the opposite sides 2.3 and at the lower end 2.2 thereof. Each of the coupling elements 8 includes an arm 8.1 extending upwardly from the folding axis 7 and an arm 8.2 extending downwardly therefrom. The coupling mechanism 22 also includes a stop 9 stationarily mounted on the backrest 2 at the opposite sides 2.3 thereof adjacent to the folding axis 7. When the backrest 2 is in the erected seating position, the upper arm 8.1 of each coupling element 8 engages the respective stop 9 on the backrest 2 while the lower arm 8.2 of the coupling element 8 implemented in the form of a hook extends from behind the rear end 1.2 of the seat cushion 1 to along the opposite sides 1.3 thereof. At the end of each arm 8.2, a pivot 10 is provided via which the coupling element 8 is connected with an end of a lever 12 stationarily attached on the respective side 1.3 of the seat cushion 1.

The coupling mechanism 22 also includes a pair of guide bars 13 located at the front end 1.1 of the seat cushion 1 and disposed spaced apart with respect to the width of the seat 20. These guide bars 13 pivotally support the front end 1.1 of the seat cushion 1 by being pivotally attached at 14 to the seat cushion 1 and at 15 to the chassis via a web plate 16 which is welded to a rotationally fixed transverse tube 17 at whose ends the fastening points 4 can be latched with the lateral walls of the motor vehicle.

In order to be able to fold the backrest 2, as has already been mentioned, the latching must be released at fastening points 6 on the motor vehicle lateral walls. When folding back the backrest 2, the coupling elements 8 are carried along by the stop 9 in contact on their upper arm 8.1, i.e. the coupling elements 8 pivot together with the backrest 2 in the clockwise direction about the folding axis 7. The pivot 10 thereby moves in a circular arc about the folding axis 7 causing displacement of the seat cushion 1 from the retracted seating position of FIG. 1 upwardly and toward the front to the extended sleeping position of FIG. 2 since the guide bars 13 take up this arcuate motion through the rigid seat cushion 1. At the completion of the arcuate motion of the folding process, the backrest 2 and the seat cushion 1 form a substantially level and gapless sleeping surface as is evident in FIG. 2. In order to secure the seat cushion 1 and backrest 2 at these respective positions and thus the seat 20 in the sleeping condition, the latching of the backrest 2 at the fastening points 6 with the lateral walls of the motor vehicle chassis can again be established.

When folding the backrest 2 forward to the storage position of FIG. 3, the stops 9 are released from engagement with the coupling elements 8. During this forward folding process, the seat cushion 1 remains in the retracted seating position.

Referring now to FIGS. 4 and 5, there is depicted the second embodiment of the vehicle motor seat 20 according to the present invention. It differs from the first embodiment of FIGS. 1 to 3 only in that the coupling elements 8 are not mounted pivotally on the folding axis 7 but rather are fixedly attached thereon. In second embodiment, the stops 9 on the backrest 2 as well as the arm 8.1 of the coupling element 8 are no longer required since the coupling elements 8 are carried along when folding back the backrest 2 due to their fixed attachment on the folding axis 7. In the second embodiment, the backrest 2 cannot be folded forward from its erected seating position of FIG. 4 to the FIG. 3 position of the first embodiment. However, this does not need to be of disadvantage since in many applications such a folding motion of the backrest 2 is not required.

It is thought that the present invention and many of its advantages will be understood from the foregoing description and it will be apparent that various changes may be made thereto without departing from the spirit and scope of the invention or sacrificing its material advantages, the forms hereinbefore described being merely preferred or exemplary embodiments thereof.

We claim:

1. A motor vehicle seat, comprising:
   (a) a backrest foldable between an erected seating position and a folded sleeping position;
   (b) a seat cushion movable between a retracted seating position and an extended sleeping position, said seat cushion having opposite front and rear ends and a pair of opposite sides extending between said front and rear ends; and
   (c) a coupling mechanism mechanically supporting said seat cushion and coupling said seat cushion to said backrest such that folding of said backrest from said erected seating position to said folded sleeping position causes displacement of said seat cushion from said retracted seating position to said extended sleeping position such that in said extended sleeping position said seat cushion is substantially aligned with said backrest in said folded sleeping position, said coupling mechanism including
   (i) a pair of rigid coupling elements disposed adjacent to said opposite sides and at said rear end of said seat cushion and pivotally mounted at a folding axis extending transverse to said backrest, said coupling elements also mounted at said lower end of said backrest to undergo movement about said folding axis such that movement of said backrest between said erected seating position and said folded sleeping position causes movement of said coupling elements about said folding axis of said backrest and displacement of said seat cushion between said retracted seating position and said extended sleeping position, and
   (ii) a pair of lever elements disposed adjacent to and fixedly attached at said opposite sides of said seat cushion adjacent to said rear end thereof, said lever elements being respectively pivotally connected to said coupling elements.

2. The seat of claim 1 wherein said backrest has opposite lower and upper ends and a pair of opposite sides extending between said lower and upper ends.

3. The seat of claim 2 wherein said folding axis extends transversely through said lower end of said backrest, said backrest being mounted to undergo pivotal movement about said folding axis.

4. The seat of claim 2 wherein each of said coupling elements extends between and is coupled respectively with a rear end of said seat cushion and said lower end of said backrest such that movement of said backrest between said erected seating position and said folded sleeping position causes pivotal movement of said coupling elements and displacement of said seat cushion between said retracted seating position and said extended sleeping position.

5. The seat of claim 1 wherein said coupling mechanism further includes a pair of front guide bars disposed adjacent to opposite sides and at said front end of said seat cushion and supporting said front end of said seat cushion such that said seat cushion can undergo displacement between said retracted seating position and extended sleeping position.

6. The seat of claim 1 wherein each of said coupling elements is fixedly mounted at said lower end of said backrest to undergo pivotal movement with said backrest about said folding axis.

7. The seat of claim 1 wherein each of said coupling elements has opposite end portions disposed bilaterally diametrically from one another on opposite sides of said folding axis.

8. The seat of claim 7 wherein one of said opposite end portions of each of said coupling elements extends downwardly from said folding axis along and pivotally secured to one of said opposite sides of said seat cushion at a rear end thereof.

9. The seat of claim 8 further comprising:
   a pair of stops each stationarily mounted on and extending outwardly from one of said opposite sides of said backrest adjacent to said folding axis thereof.

10. The seat of claim 9 wherein the other of said opposite end portions of each of said coupling elements extends upwardly from said folding axis along one of said opposite sides of said backrest at said lower end thereof and is engagable with one of said stops stationarily mounted on said backrest such that during pivotal folding of said backrest toward said folded sleeping position said stops on said backrest carry along said coupling elements and correspondingly causes said coupling elements to pivot about said folding axis of said backrest relative to said seat cushion.

11. The seat of claim 9 wherein the other of said opposite end portions of each of said coupling members extends upwardly from said folding axis along one of said opposite sides of said backrest at said lower end thereof such that during pivotal folding of said backrest toward a reverse folded storage position said stops of said backrest undergo displacement away from said other opposite end portions of said coupling members.

12. The seat of claim 1 wherein said backrest is latchable stationary to a chassis in said erected seating position of said backrest.

13. The seat of claim 1 wherein said backrest is latchable stationary to a chassis in said folded sleeping position of said backrest.

* * * * *